United States Patent [19]
Seventko et al.

[11] Patent Number: 5,803,490
[45] Date of Patent: Sep. 8, 1998

[54] SIDE AIR BAG

[75] Inventors: Michael J. Seventko, Berkley; John C. St. Pierre, Sterling Heights; Lawrence M. Marcinkowski, Auburn Hills; Donald L. Silsbe, Woodhaven, all of Mich.

[73] Assignee: Chrysler Corporation, Auburn Hills, Mich.

[21] Appl. No.: 851,576

[22] Filed: May 5, 1997

[51] Int. Cl.$^6$ ................................................. B60R 21/22
[52] U.S. Cl. .................................. 280/730.2; 280/730.1; 280/728.2; 280/728.3
[58] Field of Search ........................... 280/730.2, 730.1, 280/728.2, 728.3

[56] References Cited

U.S. PATENT DOCUMENTS

| | | | |
|---|---|---|---|
| 4,941,678 | 7/1980 | Lauritzen et al. | 280/732 |
| 5,533,750 | 7/1996 | Karlow et al. | 280/730.2 |
| 5,556,129 | 9/1996 | Coman et al. | 280/730.2 |
| 5,588,671 | 12/1996 | Boumarafi et al. | 280/730.2 |
| 5,647,609 | 7/1997 | Spencer et al. | 280/730.2 |
| 5,651,582 | 7/1997 | Nakano | 297/216.13 |
| 5,667,242 | 9/1997 | Slack et al. | 280/730.2 |
| 5,667,243 | 9/1997 | Fisher et al. | 280/730.2 |
| 5,669,627 | 9/1997 | Marjanski et al. | 280/728.3 |
| 5,690,354 | 11/1997 | Logan et al. | 280/728.2 |

FOREIGN PATENT DOCUMENTS

| 2261636 | 5/1993 | United Kingdom | 280/730.2 |
|---|---|---|---|

*Primary Examiner*—Christopher P. Ellis
*Attorney, Agent, or Firm*—Lawrence J. Shurupoff

[57] ABSTRACT

An air bag module is mounted on a side frame bar of the seat back of a front seat of an automotive vehicle. The module has a canister provided with a door which is adapted to swing out and form an opening through which the air bag can deploy in a generally forward direction to help protect an occupant of the seat in a side impact.

6 Claims, 4 Drawing Sheets

SIDE AIR BAG

FIELD OF INVENTION

This invention relates generally to air bags for automotive vehicles, and more particularly to a seat-mounted side air bag.

BACKGROUND AND SUMMARY OF THE INVENTION

Air bags typically are carried by the steering wheel and the instrument panel to protect the driver and front seat passenger in the event of a frontal impact. Such air bags are not intended to protect in a side impact. Hence, there is a potential need for air bag protection when a vehicle is struck from the side.

In accordance with the present invention, an air bag module is mounted on the driver's seat back and/or the seat back of the front passenger. Preferably, the air bag module is mounted on a bracket which in turn is mounted on the frame of the seat back. The module has a canister provided with a door which is adapted to swing out and form an opening through which the air bag can deploy in a generally forward direction to help protect an occupant of the seat in a side impact. Preferably, the opening in the canister opens laterally outwardly and the door is hinged to the rear marginal edge of the opening to direct the deployment of the air bag forwardly at a laterally outward slant.

One object of this invention is to provide a side air bag mounted on the front seat back to help protect the occupant in the event of a side impact, having the foregoing features and capabilities.

Another object is to provide a seat back and air bag combination which is composed of a relatively few simple parts, and is capable of being inexpensively manufactured and quickly assembled and installed.

Other objects, features and advantages of the invention will become more apparent as the following description proceeds, especially when considered with the accompanying drawings.

DETAILED DESCRIPTION OF THE PREFERRED EMBODIMENT

Figure 1:
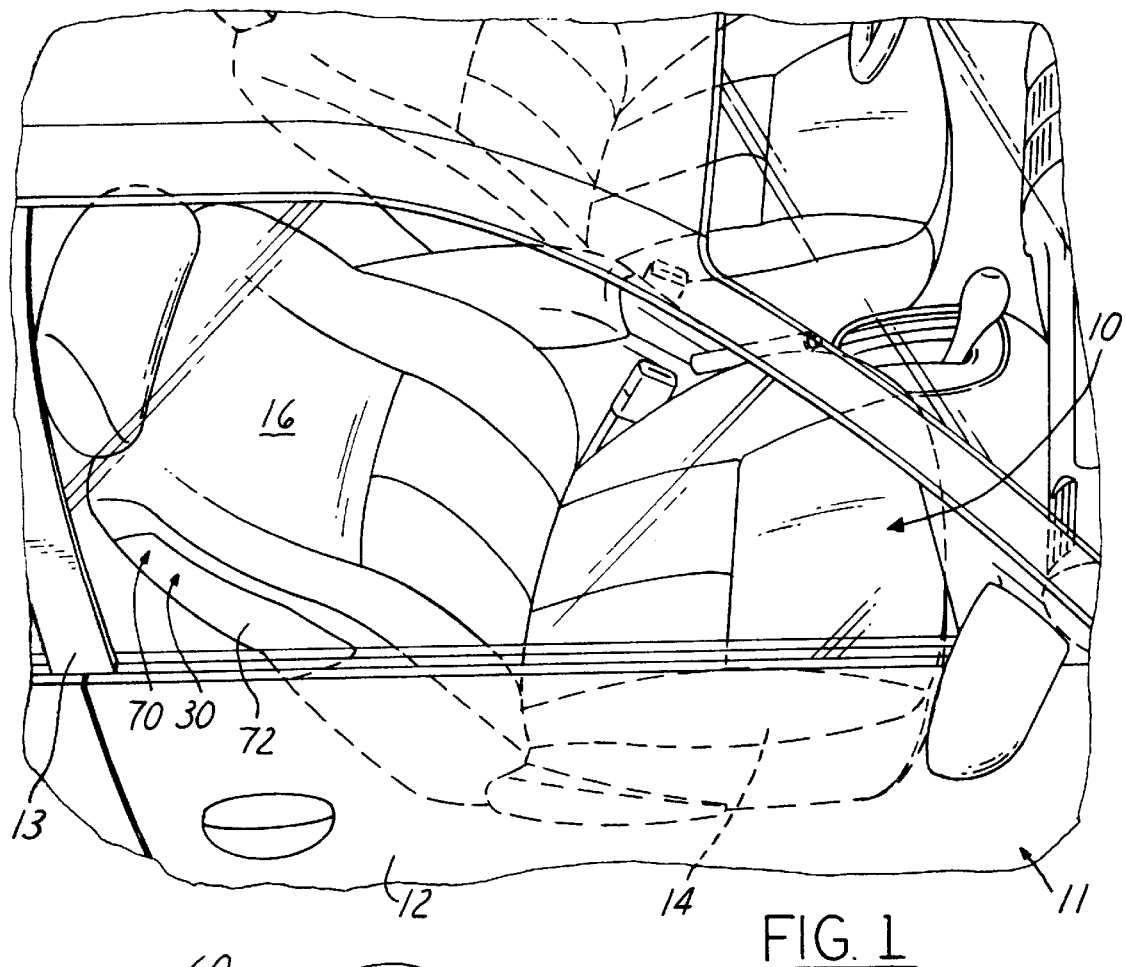
FIG. 1 is a fragmentary perspective view of an automobile having an air bag module mounted on the side of a front seat back, constructed in accordance with the invention.
Figure 2:
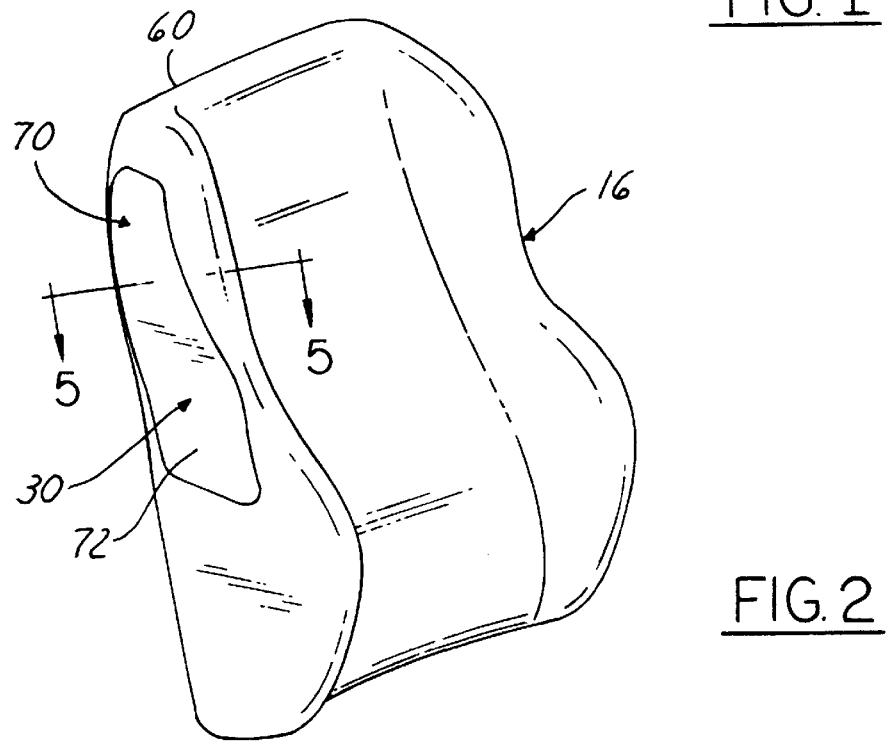
FIG. 2 is a perspective view of the seat back and associated air bag module.
Figure 3:
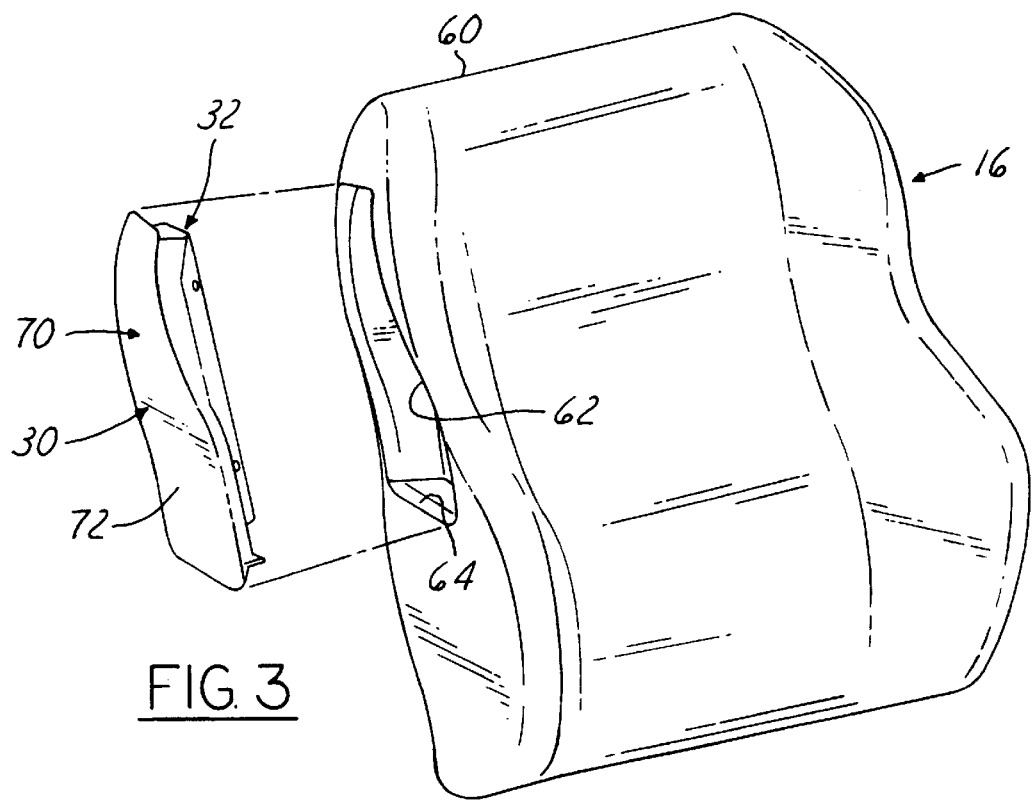
FIG. 3 is an exploded perspective view showing the air bag module separated from the seat back.
Figure 4:
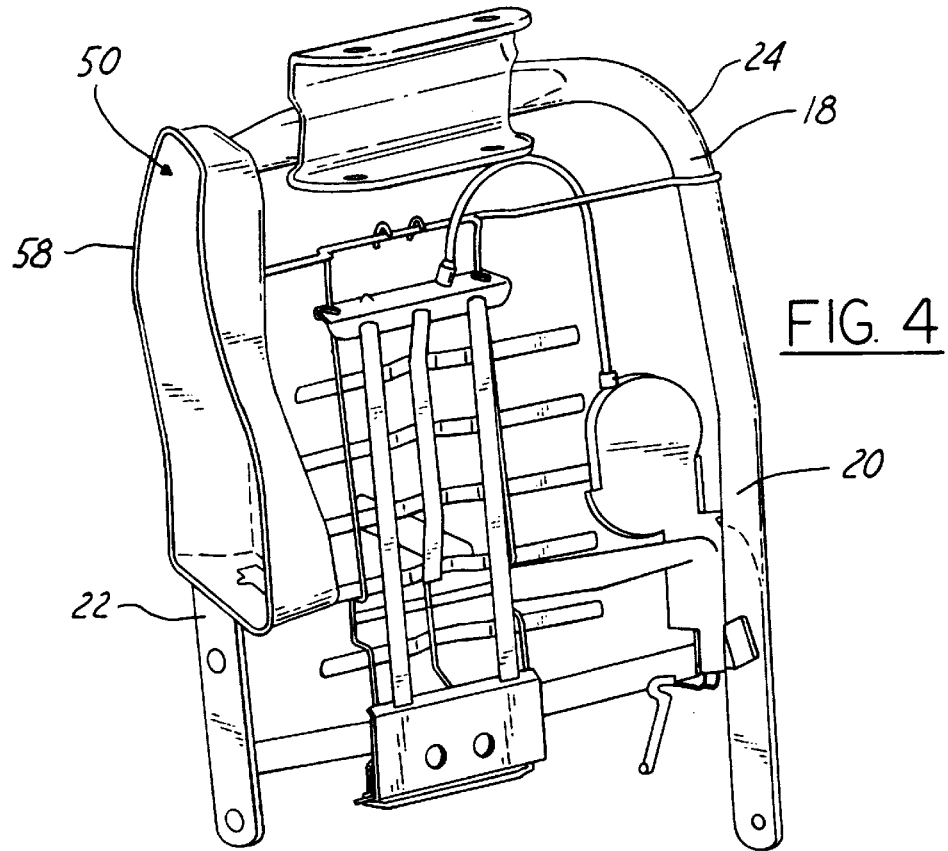
FIG. 4 is a perspective view of the seat back with the cushion material and cover layer removed, showing a bracket, for supporting the air bag module, mounted on the frame of the seat back.
Figure 5:
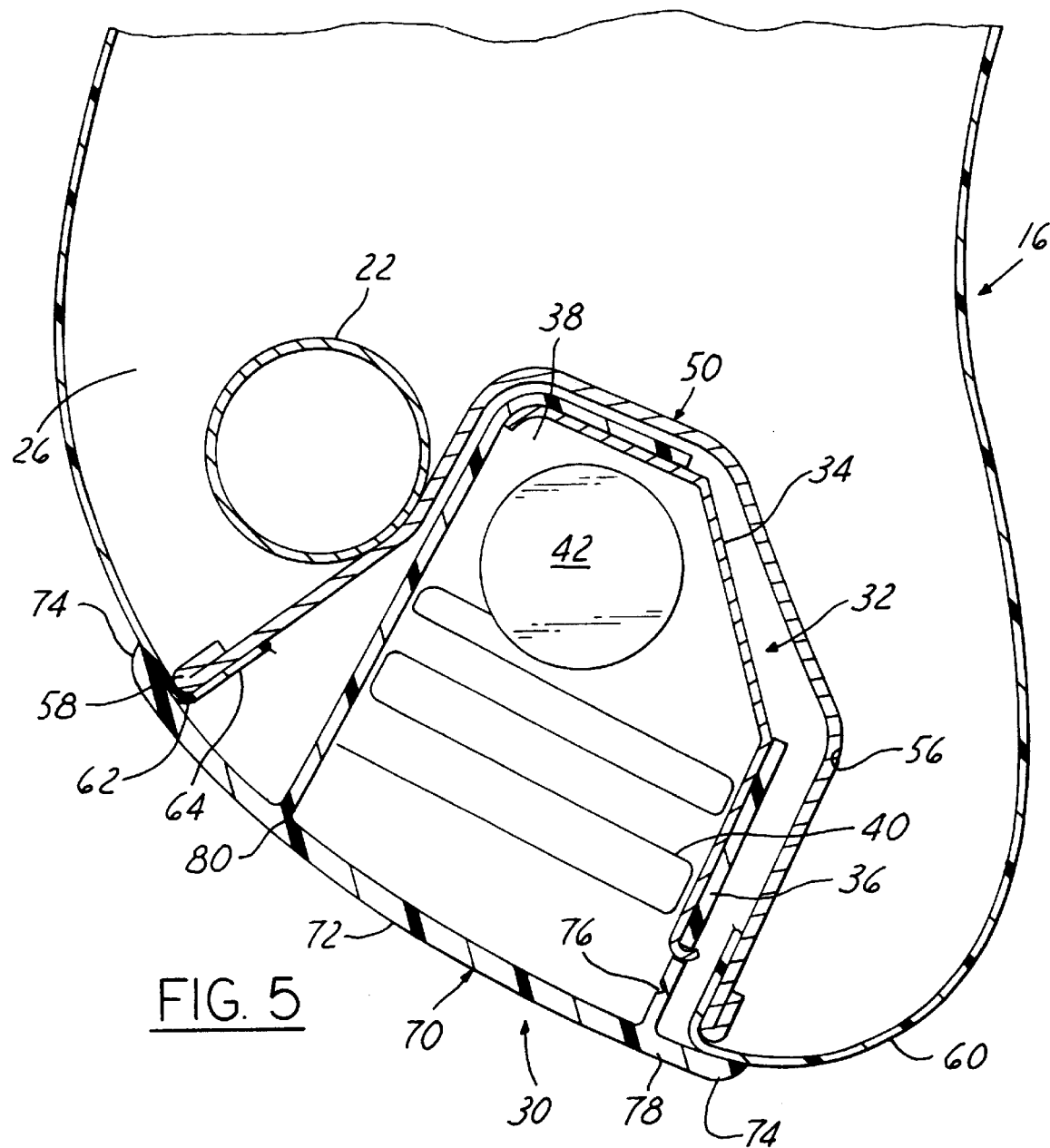
FIG. 5 is a sectional view taken on the line 5—5 in FIG. 2.

Referring now more particularly to the drawings, a front seat 10 is shown mounted in an automotive vehicle 11. The vehicle has a side passenger door 12 and a pillar 13 at the rear of the passenger door. The seat 10 has a seat bottom 14 and a seat back 16.

The seat back 16 has a metal frame 18 of inverted, generally U-shape. The frame 18 has laterally spaced-apart, generally vertical, laterally inner and outer side frame bars 20 and 22 integrally connected at their upper ends by a generally horizontal frame bar 24. The side frame bars 20 and 22 are adjacent to the laterally inner and outer side edge portions of the seat. The frame 18 is completely embedded in the cushion material 26 of the seat back.

An air bag module 30 is mounted on a hollow bracket 50. The air bag module 30 comprises a canister 32 which consists of a metal canister part 34 and plastic canister part 36. The canister parts 34 and 36 together form an enclosure or housing 38 for a folded air bag 40 and an air bag inflator 42.

The canister 32 is connected to the seat back frame 18 via the hollow bracket 50. The hollow bracket 50 is in the shape of a vertically elongated bowl or trough, and is welded or otherwise permanently secured to the upper portion of the outer frame bar 22 of the seat frame. The canister 32 is rigidly secured to the hollow bracket 50 as by one or more nut and bolt assemblies each consisting of a nut 52 and threaded bolt 54. The hollow bracket 50 fits into a cavity 56 in the cushion material with its open side facing laterally outwardly and its annular rim 58 disposed at the surface of the seat back.

The seat back has an outer trim layer 60 of leather or vinyl or cloth or other suitable cover material which is applied over the cushion material and forms a complete cover for the seat back except for the hollow bracket 50 and air bag module 30 disposed therein. As shown, the trim layer 60 has an opening 62 around the rim 58 of the hollow bracket 50 to expose the air bag module. The material of the trim layer 60 surrounding the opening 62 forms an annular flap 64 which is folded inwardly over the rim 58 of the bracket and secured.

The plastic canister part 36 has an integral, generally vertical panel 70 which extends over the open side of the hollow bracket 50 across the opening 62 in the trim layer 60 and overlaps the trim layer 60 on all sides around the opening. The portion of the panel 70 extending across the enclosure or housing 38 of the canister constitutes the door 72 of the canister. The door 72 completely closes the housing 38. The marginal portion 74 of the panel 70 around the door overlaps the trim layer 60 and cooperates with the flap 64 in minimizing the probability of the insertion of a person's hand or any object into the hollow bracket 50 or into the cushion material surrounding the bracket.

There is a generally vertical groove or seam 76 in the canister part 36 adjacent the front edge 78 of the door 72. The rear edge of the door 72 provides a hinge point 80 enabling the door to swing out as later described. The door 72 is generally vertical and faces laterally outwardly toward the passenger door 12 along the side of the vehicle.

Figure 6:
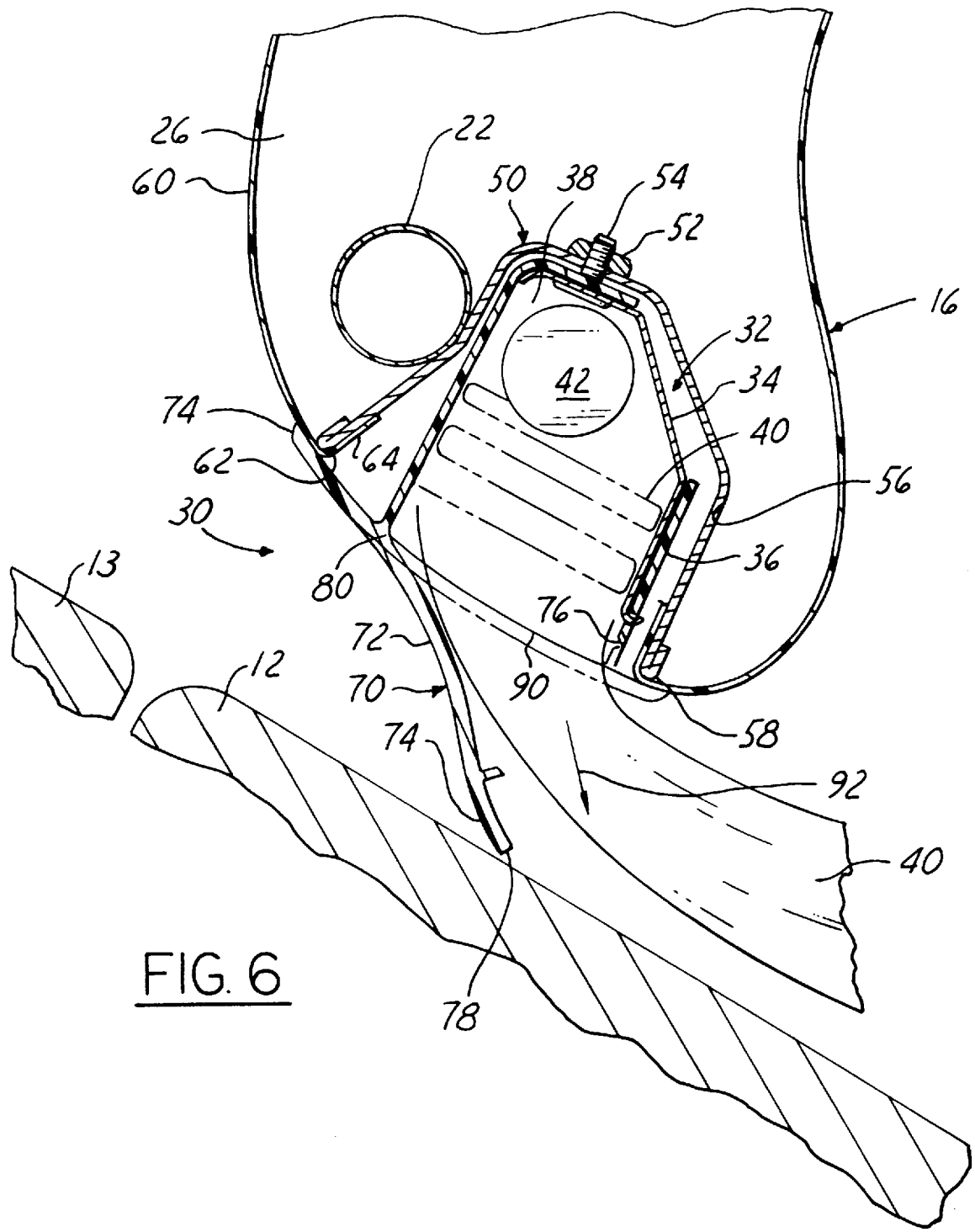
FIG. 6 is a sectional view similar to FIG. 5, but showing the air bag deployed.

When the air bag inflates, as in a side impact, it presses against the canister door 72 with enough force to tear the seam 76, whereupon the door 72 swings open on its hinge 80 to the position shown in FIG. 6 in which it extends from the hinge 80 at an angle directed laterally outwardly at a forward slant. The opening of the door 72 forms an opening 90 extending from the hinge 80 at the rear of the opening to the seam 76. The air bag deploys through the opening 90 as shown in a generally forward direction but with a laterally outward slant as indicated by the arrow 92. The inflated air bag 40 will help protect the occupant of the seat 10 in a side impact.

The air bag module 30 is shown mounted on the front seat back on the passenger side, but may also be mounted on the driver's seat back.

What is claimed is:

1. In combination, a motor vehicle seat provided with a seat back having a laterally outer side edge portion, said seat back having a frame adjacent said laterally outer side edge portion, an air bag module comprising a canister, an air bag stored in said canister, means mounting said canister on said frame, said canister having a door which is normally closed but is adapted to swing out and form an opening in said canister through which the air bag can deploy in a generally forward direction to help protect an occupant of the seat in a side impact, wherein said seat back has cushion material and said frame comprises an elongated, generally upright frame bar extending within said cushion material, wherein said mounting means comprises a bracket fitted in a cavity in the cushion material and secured to said frame bar and said canister is secured to said bracket, wherein said bracket is bowl-shaped facing laterally outwardly and having a rim disposed at the surface of the seat back, and an outer trim layer covering said cushion material, said trim layer having an opening exposing said door, wherein the material of said trim layer surrounding the opening therein forms a flap which is folded inwardly over the rim of said bracket.

2. The combination defined in claim 1, wherein said opening in the canister and the door when open direct the deployment of the air bag in a forward direction at a laterally outward slant.

3. The combination defined in claim 1, wherein said opening in the canister and the door when open direct the deployment of the air bag in a direction forwardly at a laterally outward slant.

4. The combination defined in claim 3, wherein the opening in the canister opens laterally outwardly and has a generally vertical, rear marginal edge, said door has a hinge connection to said rear marginal edge such that when said door opens it will direct the deployment of the air bag as aforesaid.

5. In combination, a motor vehicle seat provided with a seat back having a laterally outer side edge portion, said seat back having a frame adjacent said laterally outer side edge portion, an air bag module comprising a canister having an interior metal portion and a plastic outer portion connected together to form an air bag housing, an air bag stored in said canister, and means mounting said canister on said frame, said canister having a door formed by said outer plastic portion to swing out and form an opening in said canister through which the air bag can deploy in a generally forward direction to help protect an occupant of the seat in a side impact.

6. In combination, a motor vehicle seat provided with a seat back having a laterally outer side edge portion, said seat back having a frame adjacent said laterally outer side edge portion, cushion material supported by said frame and an outer trim layer covering said cushion material, an air bag module comprising a canister, an air bag stored in said canister, a bracket mounting said canister on said frame said bracket having a rim, said canister having a door which is normally closed but is adapted to swing out and form an opening in said canister through which the air bag can deploy in a generally forward direction to help protect an occupant of the seat in a side impact, and wherein said trim layer surrounding said opening forms a flap folded inwardly over said rim of said bracket.

* * * * *